(12) United States Patent
Watanabe et al.

(10) Patent No.: US 11,738,512 B2
(45) Date of Patent: *Aug. 29, 2023

(54) THREE-DIMENSIONAL SHAPED ARTICLE PRODUCTION APPARATUS

(71) Applicant: SEIKO EPSON CORPORATION, Tokyo (JP)

(72) Inventors: Manabu Watanabe, Shiojiri (JP); Toshimitsu Hirai, Hokuto (JP); Akihiko Tsunoya, Okaya (JP); Kaoru Momose, Hara-mura (JP)

(73) Assignee: Seiko Epson Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/932,379

(22) Filed: Sep. 15, 2022

(65) Prior Publication Data

US 2023/0011696 A1    Jan. 12, 2023

Related U.S. Application Data

(63) Continuation of application No. 17/324,530, filed on May 19, 2021, now Pat. No. 11,485,084.

(30) Foreign Application Priority Data

May 22, 2020    (JP) .................................. 2020-089840

(51) Int. Cl.
*B29C 64/314* (2017.01)
*B29C 64/165* (2017.01)
(Continued)

(52) U.S. Cl.
CPC .......... *B29C 64/314* (2017.08); *B29C 64/165* (2017.08); *B29C 64/209* (2017.08);
(Continued)

(58) Field of Classification Search
None
See application file for complete search history.

(56) References Cited

U.S. PATENT DOCUMENTS

| 2018/0354192 | A1 | 12/2018 | Iwase et al. | |
| 2018/0361663 | A1* | 12/2018 | Burt | B22F 12/13 |
| 2021/0206055 | A1* | 7/2021 | Ederer | B29C 64/165 |

FOREIGN PATENT DOCUMENTS

JP    2019-00101    1/2019

* cited by examiner

*Primary Examiner* — Yung-Sheng M Tsui
*Assistant Examiner* — Melody Tsui
(74) *Attorney, Agent, or Firm* — WORKMAN NYDEGGER (57) ABSTRACT

A three-dimensional shaped article production apparatus includes a shaping table, a layer forming section that forms a powder layer, a head that ejects a liquid containing a binder to a shaping region of a three-dimensional shaped article, a liquid supply system that supplies the liquid to the head, and a moving system that relatively moves the head with respect to the shaping table, wherein the head includes a nozzle that ejects the liquid, a pressure chamber that communicates with the nozzle, a supply flow channel that communicates with the pressure chamber upstream in a supply direction of the liquid, and a circulation flow channel that communicates with the pressure chamber downstream in the supply direction, the circulation flow channel includes a first filter, and a pore diameter of the first filter is larger than a particle diameter of a powder for forming the powder layer.

6 Claims, 8 Drawing Sheets

(51) Int. Cl.
*B29C 64/209* (2017.01)
*B29C 64/386* (2017.01)
*B33Y 50/00* (2015.01)
*B33Y 40/10* (2020.01)
*B33Y 30/00* (2015.01)
*B33Y 10/00* (2015.01)

(52) U.S. Cl.
CPC ............. *B29C 64/386* (2017.08); *B33Y 10/00* (2014.12); *B33Y 30/00* (2014.12); *B33Y 40/10* (2020.01); *B33Y 50/00* (2014.12)

THREE-DIMENSIONAL SHAPED ARTICLE PRODUCTION APPARATUS

The present application is a continuation of U.S. patent application Ser. No. 17/324530, filed May 19, 2021, which is based on, and claims priority from JP Application Serial Number 2020-089840, filed on May 22, 2020, the disclosures of which are hereby incorporated by reference herein in their entirety.

BACKGROUND

1. Technical Field

The present disclosure relates to a three-dimensional shaped article production apparatus.

2. Related Art

Heretofore, various types of three-dimensional shaped article production apparatuses have been used. Among these, there is a three-dimensional shaped article production apparatus for producing a three-dimensional shaped article by forming a powder layer and ejecting a liquid from a nozzle of a head to a shaping region of the three-dimensional shaped article in the powder layer. For example, JP-A-2019-1010 (Patent Document 1) discloses a three-dimensional shaping apparatus for producing a three-dimensional shaped article by forming a layer with a powder material and ejecting a curing liquid to the layer from a nozzle of a line head.

However, in a three-dimensional shaped article production apparatus for producing a three-dimensional shaped article by ejecting a liquid from a head to a powder layer as in the three-dimensional shaping apparatus described in Patent Document 1, a powder for forming the powder layer sometimes enters the inside of the head from a nozzle. When such a powder enters the inside of the head, the liquid sometimes thickens to cause ejection failure of the liquid in some cases.

SUMMARY

A three-dimensional shaped article production apparatus according to the present disclosure for solving the above problem includes a shaping table, a layer forming section that forms a powder layer at the shaping table, a head that ejects a liquid containing a binder to a shaping region of a three-dimensional shaped article in the powder layer, a liquid supply system that supplies the liquid to the head, and a moving system that relatively moves the head with respect to the shaping table, wherein the head includes a nozzle that ejects the liquid, a pressure chamber that communicates with the nozzle, a supply flow channel that communicates with the pressure chamber upstream in a supply direction of the liquid, and a circulation flow channel that communicates with the pressure chamber downstream in the supply direction, the circulation flow channel includes a first filter, and a pore diameter of the first filter is larger than a particle diameter of a powder for forming the powder layer.

DESCRIPTION OF EXEMPLARY EMBODIMENTS

First, the present disclosure will be schematically described.

A three-dimensional shaped article production apparatus according to a first aspect of the present disclosure for solving the above problem includes a shaping table, a layer forming section that forms a powder layer at the shaping table, a head that ejects a liquid containing a binder to a shaping region of a three-dimensional shaped article in the powder layer, a liquid supply system that supplies the liquid to the head, and a moving system that relatively moves the head with respect to the shaping table, wherein the head includes a nozzle that ejects the liquid, a pressure chamber that communicates with the nozzle, a supply flow channel that communicates with the pressure chamber upstream in a supply direction of the liquid, and a circulation flow channel that communicates with the pressure chamber downstream in the supply direction, the circulation flow channel includes a first filter, and a pore diameter of the first filter is larger than a particle diameter of a powder for forming the powder layer.

A foreign substance generated with the production of a head during the production of the head or the like sometimes flows backward from the circulation flow channel to the pressure chamber to deteriorate the performance of the head, however, by providing the first filter in the circulation flow channel as in this aspect, the foreign substance generated with the production of the head can be prevented from flowing backward from the circulation flow channel to the pressure chamber. Further, according to this aspect, the pore diameter of the first filter is larger than the particle diameter of the powder for forming the powder layer. Therefore, the liquid can be prevented from continuously thickening between the nozzle and the first filter due to successive accumulation in the head because the powder that enters the inside of the head from the nozzle cannot pass through the first filter. Accordingly, the liquid in the head can be prevented from thickening, so that the ejection failure of the liquid can be suppressed.

In a three-dimensional shaped article production apparatus according to a second aspect of the present disclosure, in the first aspect, an inner diameter of the nozzle is larger than the pore diameter of the first filter.

According to this aspect, the inner diameter of the nozzle is larger than the pore diameter of the first filter. Therefore, even if the powder enters the inside of the head from the nozzle, the powder can be discharged again through the nozzle.

In a three-dimensional shaped article production apparatus according to a third aspect of the present disclosure, in the first or second aspect, a second filter is provided at a position downstream in the supply direction of the first filter.

According to this aspect, a second filter is provided at a position downstream in the supply direction of the first filter. Therefore, the capture performance of a foreign substance contained in the liquid returning to the supply flow channel from the circulation flow channel can be enhanced.

In a three-dimensional shaped article production apparatus according to a fourth aspect of the present disclosure, in the third aspect, a pore diameter of the second filter is smaller than the particle diameter of the powder for forming the powder layer.

According to this aspect, the pore diameter of the second filter is smaller than the particle diameter of the powder for forming the powder layer. Therefore, the powder that enters the inside of the head from the nozzle and passes through the first filter can be captured by the second filter.

In a three-dimensional shaped article production apparatus according to a fifth aspect of the present disclosure, in the third or fourth aspect, the second filter is replaceable.

According to this aspect, the second filter is replaceable. Therefore, when clogging or the like of the second filter has occurred to deteriorate the performance as the filter, or the like, it can be easily returned to the original state.

In a three-dimensional shaped article production apparatus according to a sixth aspect of the present disclosure, in the fifth aspect, a flow rate sensor of the liquid is provided at a position downstream in the supply direction of the second filter in the circulation flow channel, and when it is detected that the flow rate of the liquid is equal to or less than a threshold value by the flow rate sensor, information for replacing the second filter is output.

According to this aspect, a flow rate sensor of the liquid is provided, and when it is detected that the flow rate of the liquid is equal to or less than a threshold value by the flow rate sensor, information for replacing the second filter is output. Therefore, a user can easily recognize an appropriate time to replace the second filter.

In a three-dimensional shaped article production apparatus according to a seventh aspect of the present disclosure, in any one of the first to sixth aspects, a third filter having a pore diameter smaller than the particle diameter of the powder for forming the powder layer is provided in the supply flow channel.

According to this aspect, a third filter having a pore diameter smaller than the particle diameter of the powder for forming the powder layer is provided in the supply flow channel. Therefore, the powder that enters the inside of the head from the nozzle can be prevented from flowing backward in the supply flow channel.

In a three-dimensional shaped article production apparatus according to an eighth aspect of the present disclosure, in anyone of the first to seventh aspects, a bottom face of a region adjacent to the pressure chamber in the circulation flow channel is disposed at a lower position in a gravity direction than a bottom face of a region adjacent to the pressure chamber in the supply flow channel.

According to this aspect, a bottom face of a region adjacent to the pressure chamber in the circulation flow channel is disposed at a lower position in a gravity direction than a bottom face of a region adjacent to the pressure chamber in the supply flow channel. The powder that enters the inside of the head from the nozzle is likely to flow to a lower side due to the effect of gravity, and therefore, the powder is more likely to flow to the circulation flow channel side than to flow backward to the supply flow channel side. Accordingly, it is possible to prevent the powder that enters the inside of the head from the nozzle from flowing backward in the supply flow channel.

Hereinafter, embodiments according to the present disclosure will be described with reference to the accompanying drawings.

First Embodiment

First, an outline of a three-dimensional shaped article production apparatus 1 of a first embodiment will be described with reference to FIG. 1. Here, in FIG. 1 and the respective drawings described later, an X direction in the drawings is a horizontal direction and corresponds to a reciprocating movement direction of a supply unit 8, and in the X direction, an X1 direction is a forward direction and an X2 direction is a backward direction. Further, a Y direction is a horizontal direction and is also a direction orthogonal to the X direction and corresponds to a direction in which the rotational axis of a roller 6 extends. Further, a Z direction is a vertical direction and corresponds to a stacking direction of a layer 500.

Note that the "three-dimensional shaping" as used herein refers to formation of a so-called stereoscopically shaped article, and also includes, for example, formation of a shape having a thickness even if it is in a flat plate shape or a so-called two-dimensional shape.

The three-dimensional shaped article production apparatus 1 of this embodiment is a three-dimensional shaped article production apparatus for producing a three-dimensional shaped article by stacking the layer 500 composed of a layer 501, a layer 502, a layer 503, . . . and a layer 50n. Then, as shown in FIG. 1, the three-dimensional shaped article production apparatus 1 of this embodiment includes a table unit 10 having a shaping table 9, a supply unit 8 that supplies a shaping material of the three-dimensional shaped article to the shaping table 9, and a control unit 12 that controls the operation of the table unit 10 and the supply unit 8. The three-dimensional shaped article production apparatus 1 is electrically coupled to an external device 20 such as a personal computer and is configured to be able to receive an instruction from a user through the external device 20.

The shaping table 9 is configured to be able to move in the Z direction under the control of the control unit 12. A shaping face 9a of the shaping table 9 is disposed at a position lower by a predetermined distance in the Z direction with respect to an upper face portion 10a of the table unit 10, and the layer 500 for one layer is formed by supplying the shaping material of the three-dimensional shaped article from the supply unit 8 to the shaping face 9a. Then, layers are stacked by repeating movement of the shaping table 9 downward by a predetermined distance and supply of the shaping material of the three-dimensional shaped article from the supply unit 8. FIG. 1 shows a manner in which a structure body S of the three-dimensional shaped article is formed on the shaping face 9a by repeating layer formation of four layers: a layer 501, a layer 502, a layer 503, and a layer 504.

The supply unit 8 is configured to be able to move in the X direction along a guide bar 11. Further, the supply unit 8 includes a shaping material supply section 2 that supplies the shaping material containing a powder of a metal, a ceramic, a resin, or the like to the shaping table 9. As the shaping material supply section 2, a shaping material supply section 2A formed at a front side end portion in the X1 direction and a shaping material supply section 2B formed at a front side end portion in the X2 direction are included.

Further, the supply unit 8 includes a roller 6 capable of compressing and leveling the shaping material supplied to the shaping table 9. As the roller 6, a roller 6A formed next to the shaping material supply section 2A in the X direction and a roller 6B formed next to the shaping material supply section 2B in the X direction are included. Here, the shaping material supply section 2 and the roller 6 constitute a layer forming section which forms the layer 500 that is a powder layer at the shaping table 9. The supply unit 8 may include a squeegee capable of leveling the shaping material supplied to the shaping table 9 in place of the roller 6.

Further, the supply unit 8 includes a head 3 that ejects a liquid containing a binder which binds the powder contained in the shaping material supplied from the shaping material supply section 2 to a shaping region P of the three-dimensional shaped article. As the head 3, a head 3A formed next to the roller 6A in the X direction and a head 3B formed next to the roller 6B in the X direction are included. A detailed configuration of the head 3 and a detailed configuration of a liquid supply system 40 shown in FIG. 2 for supplying the liquid to the head 3 will be described later. The liquid to be ejected from the head 3 does not necessarily need to contain the binder, and a configuration in which the binder is contained in the shaping material supplied from the shaping material supply section 2 may be adopted.

Here, the liquids to be ejected from the head 3A and the head 3B are the same liquid, and both are a liquid containing a UV curable resin as the binder. However, it is not limited to such a liquid, and a liquid containing a thermosetting resin as the binder, a liquid in a state where a solid resin as the binder is dissolved in a volatile solvent, or the like may be used. Further, in the supply unit 8, a temperature sensor 7 that detects the temperature of the nozzle of the head 3 is provided corresponding to the head 3A and the head 3B.

Then, between the head 3A and the head 3B in the X direction, a UV irradiation section 4 that irradiates an ultraviolet ray capable of curing a UV curable resin is provided. The supply unit 8 of this embodiment is configured to include one UV irradiation section 4, however, a configuration in which two or more UV irradiation sections 4 are included, a configuration in which the UV irradiation section 4 is not included in accordance with the type of the liquid to be used or the like, a configuration in which a heater for curing the thermosetting resin or for volatilizing the solvent is included in place of the UV irradiation section 4, or the like may be adopted.

Figure 1:
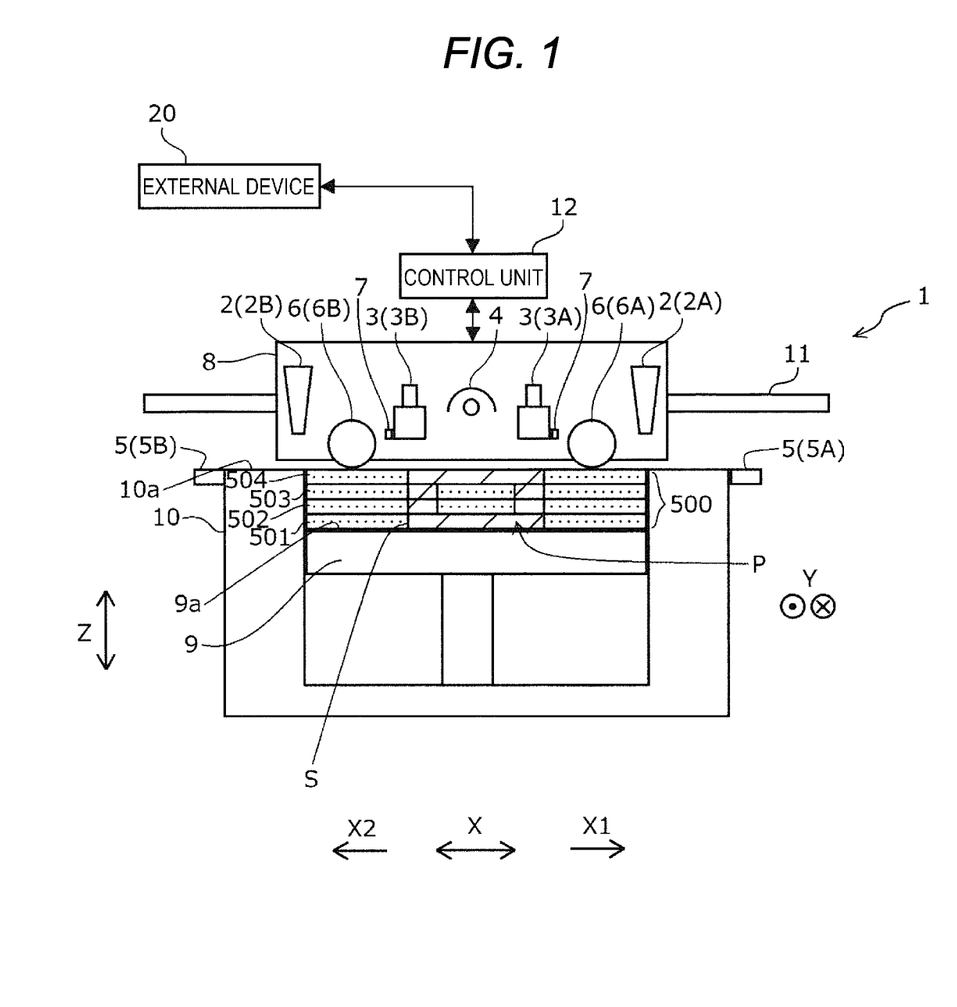
FIG. 1 is a schematic configuration view showing a three-dimensional shaped article production apparatus according to the present disclosure according to a first embodiment.

As shown in FIG. 1, in the supply unit 8 of this embodiment, the shapes of the constituent members are symmetric in the X direction. Therefore, the three-dimensional shaped article production apparatus 1 of this embodiment can execute the shaping operation of the three-dimensional shaped article while moving the supply unit 8 in the X1 direction and also can execute the shaping operation of the three-dimensional shaped article while moving the supply unit 8 in the X2 direction.

Further, as shown in FIG. 1, in the three-dimensional shaped article production apparatus 1 of this embodiment, a liquid receiving section 5 is provided in the table unit 10, and a flushing operation can be executed by ejecting the liquid from the head 3 at a position opposed to the liquid receiving section 5. That is, the position opposed to the liquid receiving section 5 is a flushing position, and therefore, naturally, the flushing position is a position different from the shaping region P of the three-dimensional shaped article. As the liquid receiving section 5, a liquid receiving section 5A and a liquid receiving section 5B are included.

Figure 2:
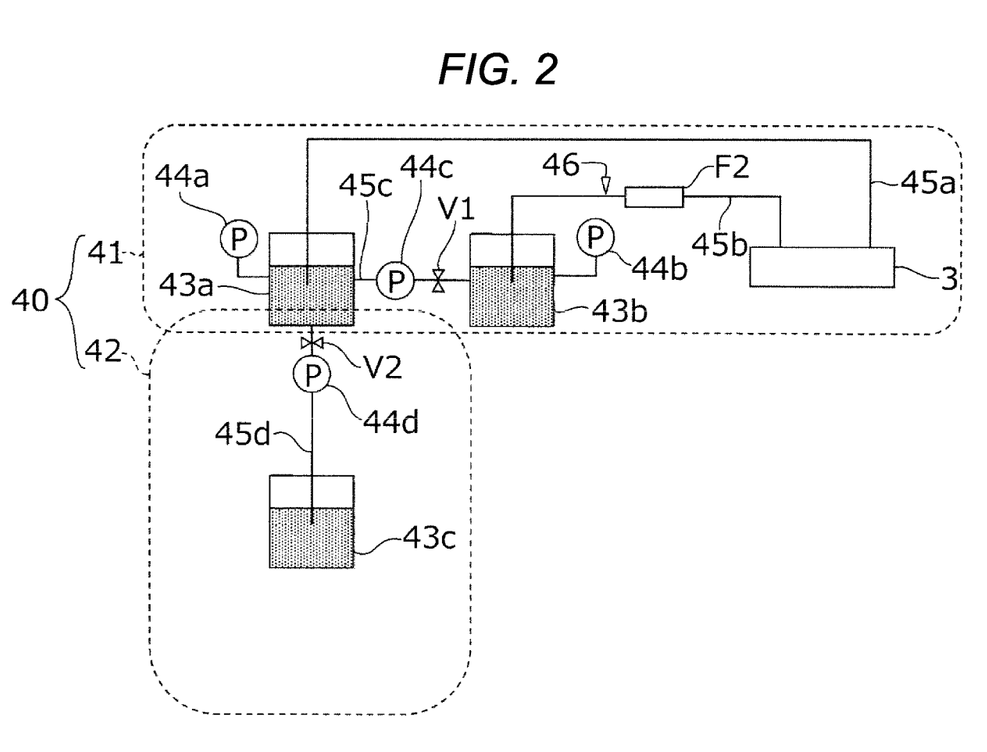
FIG. 2 is a schematic view showing a liquid supply system of the three-dimensional shaped article production apparatus in FIG. 1.

In this manner, the three-dimensional shaped article production apparatus 1 of this embodiment includes the shaping table 9, the shaping material supply section 2 and the roller 6 as the layer forming section which forms the layer 500 that is a powder layer at the shaping table 9, the head 3 that ejects the liquid containing a binder to the shaping region P of the three-dimensional shaped article in the layer 500 from the nozzle, the supply unit 8 and the table unit 10 as the moving system that relatively moves the head 3 with respect to the shaping table 9, and the control unit 12 that controls the movement of the head 3 with respect to the shaping table 9 and the driving of the head 3 by applying a voltage. Further, the apparatus includes the liquid supply system 40 that supplies the liquid to the head 3.

Hereinafter, the liquid supply system 40 will be described in detail with reference to FIG. 2. The liquid supply system 40 shown in FIG. 2 is constituted by a circulation section 41 including a supply flow channel 45a for supplying the liquid to the head 3, and a replenishment section 42 including a liquid replenishment flow channel 45d for replenishing the liquid to the circulation section 41.

The circulation section 41 includes the head 3, a pressurization controlling liquid tank 43a, a depressurization controlling liquid tank 43b, a pressurization controlling pump 44a, a depressurization controlling pump 44b, a flowing pump 44c, and a solenoid valve V1. Further, the circulation section 41 includes the supply flow channel 45a that couples the pressurization controlling liquid tank 43a to the head 3, a first circulation flow channel 45b that couples the head 3 to the depressurization controlling liquid tank 43b, and a second circulation flow channel 45c that couples the pressurization controlling liquid tank 43a to the depressurization controlling liquid tank 43b. Here, in the first circulation flow channel 45b, a filter F2, and a flow rate sensor 46 that detects the flow rate of the liquid flowing in the first circulation flow channel 45b are provided.

Figure 6:
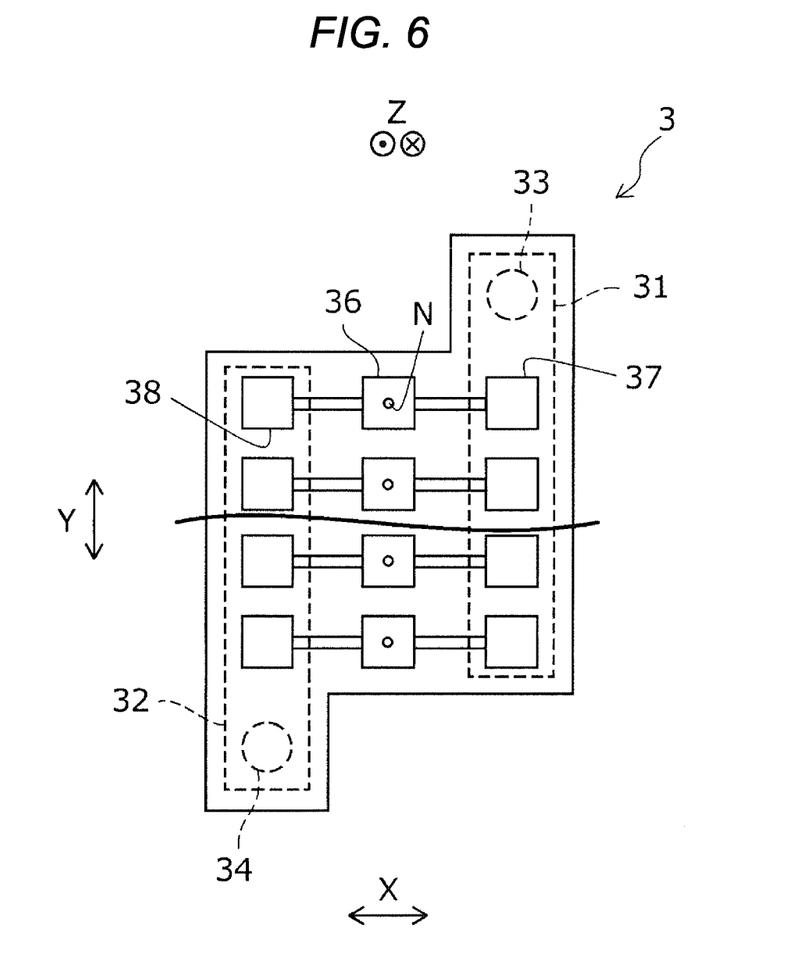
FIG. 6 is a cross-sectional view taken along the alternate long and short dash line A in FIG. 5 when viewed from the bottom face side showing the head of the three-dimensional shaped article production apparatus in FIG. 1, and is a view showing some constituent members in a see-through manner with a broken line.

By the pressurization controlling liquid tank 43a, the pressurization controlling pump 44a, the depressurization controlling liquid tank 43b, and the depressurization controlling pump 44b, differential pressure control is performed so that a slightly negative pressure is applied to a nozzle N of the head 3 shown in FIG. 6 from the atmospheric pressure.

In the second circulation flow channel 45c that allows the liquid to flow from the depressurization controlling liquid tank 43b which is a tank for depressurization to the pressurization controlling liquid tank 43a which is a tank for pressurization, the flowing pump 44c and the solenoid valve V1 are placed. In a case where the liquid ejection operation in the head 3 is executed, when the liquid is supplied to the head 3, the solenoid valve V1 is opened to cause the flowing pump 44c to operate, and the liquid is circulated in the supply flow channel 45a, the first circulation flow channel 45b, and the second circulation flow channel 45c.

The replenishment section 42 includes a liquid cartridge 43c, which is replaceable, and in which the liquid is stored, a flowing pump 44d, and a solenoid valve V2. Further, the replenishment section 42 includes the liquid replenishment flow channel 45d that couples the pressurization controlling liquid tank 43a to the liquid cartridge 43c. When the liquid is replenished from the liquid cartridge 43c to the pressurization controlling liquid tank 43a, the solenoid valve V2 is opened to cause the flowing pump 44d to operate, and the liquid is allowed to flow in the liquid replenishment flow channel 45d.

Here, the three-dimensional shaped article production apparatus 1 of this embodiment is configured such that one liquid supply system 40 is provided for each of the head 3A and the head 3B. However, for example, a configuration in which one liquid supply system serves as a liquid supply system for both the head 3A and the head 3B by, for example, coupling it to the first circulation flow channel 45b through the head 3A and the head 3B, or the like, maybe adopted. That is, a configuration in which one liquid supply system deals with a plurality of heads may be adopted. At that time, the below-mentioned supply port 33 of the head 3B is coupled to the below-mentioned discharge port 34 of the head 3A. According to such a configuration, the powder that enters the inside of the head from the nozzle of the head 3A can be prevented from penetrating into the head 3B.

Next, specific examples of the shaping material which can be used in the three-dimensional shaped article production apparatus 1 of this embodiment and constitutes the layer 500 that is the powder layer will be described. As a metal powder that can be contained in the shaping material, for example, a simple substance powder of magnesium (Mg), iron (Fe), cobalt (Co), chromium (Cr), aluminum (Al), titanium (Ti), copper, (Cu), or nickel (Ni), or a powder of an alloy containing one or more of these metals (a maraging steel, stainless steel (SUS), cobalt-chrome-molybdenum, a titanium alloy, a nickel alloy, an aluminum alloy, a cobalt alloy, or a cobalt-chromium alloy), or a mixed powder of these powders can be used.

Further, as a ceramic powder that can be contained in the shaping material, for example, silicon dioxide, titanium dioxide, aluminum oxide, zirconium oxide, silicon nitride, or the like can be preferably used.

Further, as a resin powder that can be contained in the shaping material, or a binder contained in the liquid to be ejected from the head 3, for example, PMMA (acrylic), ABS (acrylonitrile-butadiene-acrylate), ASA (acrylonitrile-styrene-acrylate), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, PVA (polyvinyl alcohol), carboxymethyl cellulose, polyoxymethylene, polymethyl methacrylate, or the like can be preferably used. In addition, for example, an acrylic resin, an epoxy resin, a silicone resin, a cellulosic resin, another synthetic resin, or the like can be used alone or in combination. Further, a thermoplastic resin, or a UV curable resin of a type using unsaturated double bond radical polymerization such as an acrylic, or a type using cationic polymerization such as an epoxy can also be used.

Further, as the solvent contained in the liquid to be ejected from the head 3, for example, water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; ionic liquids such as tetra-alkyl ammonium acetate (for example, tetra-butyl ammonium acetate, etc.), and the like are exemplified, and one type or two or more types in combination selected from these can be used.

Figure 3:
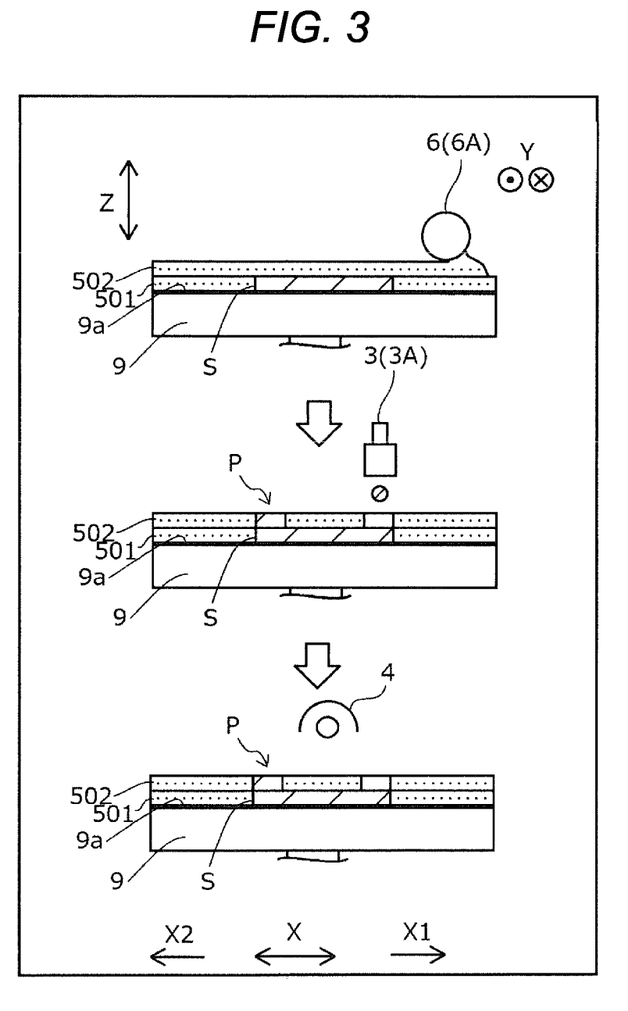
FIG. 3 is a schematic view for illustrating a three-dimensional shaped article production method performed using the three-dimensional shaped article production apparatus in FIG. 1.
Figure 4:
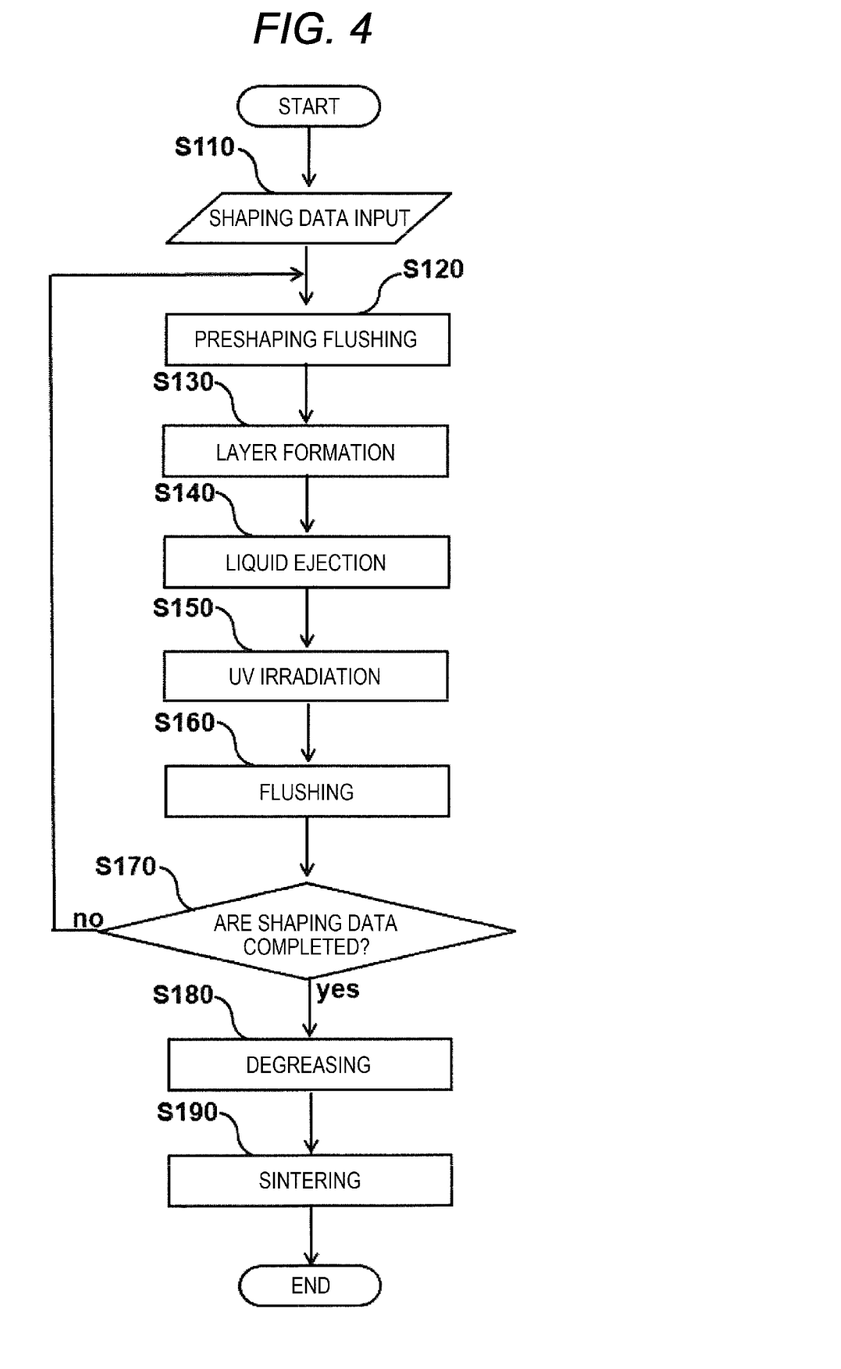
FIG. 4 is a flowchart showing an example of the three-dimensional shaped article production method performed using the three-dimensional shaped article production apparatus in FIG. 1.

Next, an example of a three-dimensional shaped article production method that can be executed using the three-dimensional shaped article production apparatus 1 will be described using the flowchart in FIG. 4 while referring to FIG. 3. The three-dimensional shaped article production method of this embodiment shown in the flowchart in FIG. 4 is carried out by allowing the control unit 12 to control the respective constituent members of the three-dimensional shaped article production apparatus 1 such as the supply unit 8 and the shaping table 9. FIG. 3 shows an example when the layer 502 in the layer 500 is formed.

In the three-dimensional shaped article production method of this embodiment, as shown in FIG. 4, first, in a shaping data input step of Step S110, shaping data of a three-dimensional shaped article to be produce is input. The input source of the shaping data of the three-dimensional shaped article is not particularly limited, however, the shaping data can be input to the three-dimensional shaped article production apparatus 1 using the external device 20.

Subsequently, in a preshaping flushing step of Step S120, preshaping flushing of the head 3 is performed. Here, when the layer 500 is formed by moving the supply unit 8 in the X1 direction, the preshaping flushing of the head 3A is performed at a position opposed to the liquid receiving section 5B. On the other hand, when the layer 500 is formed by moving the supply unit 8 in the X2 direction, the preshaping flushing of the head 3B is performed at a position opposed to the liquid receiving section 5A. The preshaping flushing step of this Step S120 may be omitted.

Subsequently, in a layer formation step of Step S130, the layer 500 is formed by supplying the shaping material from the shaping material supply section 2 to the shaping face 9a of the shaping table 9, and also compressing and leveling the shaping material with the roller 6. The uppermost state in FIG. 3 shows a state where the layer 502 is formed by moving the supply unit 8 in the X1 direction. Here, when the layer 500 is formed by moving the supply unit 8 in the X1 direction, the layer 500 is formed by supplying the shaping material from the shaping material supply section 2A, and also compressing and leveling the shaping material with the roller 6A. On the other hand, when the layer 500 is formed by moving the supply unit 8 in the X2 direction, the layer 500 is formed by supplying the shaping material from the shaping material supply section 2B, and also compressing and leveling the shaping material with the roller 6B.

Subsequently, in a liquid ejection step of Step S140, the liquid containing a binder is ejected from the nozzle N of the head 3 to the shaping region P of the three-dimensional shaped article in the layer 500. The second state from the top in FIG. 3 shows a state where the liquid is ejected from the nozzle N of the head 3 to the shaping region P of the layer 502 while moving the supply unit 8 in the X1 direction. Here, when the layer 500 is formed by moving the supply unit 8 in the X1 direction, the liquid is ejected from the head 3A. On the other hand, when the layer 500 is formed by moving the supply unit 8 in the X2 direction, the liquid is ejected from the head 3B.

Subsequently, in a UV irradiation step of Step S150, an ultraviolet ray is irradiated from the UV irradiation section 4 to the shaping region P of the three-dimensional shaped article in the layer 500. The lowermost state in FIG. 3 shows a state where an ultraviolet ray is irradiated from the UV irradiation section 4 to the shaping region P of the three-dimensional shaped article in the layer 502 while moving the supply unit 8 in the X1 direction.

Subsequently, in a flushing step of Step S160, flushing of the head 3 is performed. Here, when the layer 500 is formed by moving the supply unit 8 in the X1 direction, the flushing of the head 3A is performed at a position opposed to the liquid receiving section 5A. On the other hand, when the layer 500 is formed by moving the supply unit 8 in the X2 direction, the flushing of the head 3B is performed at a position opposed to the liquid receiving section 5B.

Then, in a shaping data completion determination step of Step S170, it is determined whether or not the formation of the layer 500 based on the shaping data input in Step S110 is all completed in the control unit 12 of the three-dimensional shaped article production apparatus 1. When it is determined that the formation of the layer 500 is not all completed, the process is returned to the preshaping flushing step of Step S120, and the subsequent layer 500 is formed. On the other hand, when it is determined that the formation of the layer 500 is all completed, the process proceeds to a degreasing step of Step S180.

In the degreasing step of Step S180, a resin component (such as the binder) of the structure body S produced by repeating the process from the preshaping flushing step of Step S120 to the shaping data completion determination step of Step S170 is degreased using an external device or the like. As a degreasing method, a method of volatilizing the resin component by heating, a method of dissolving the resin component by immersing the structure body S in a solvent, or the like is used, but the method is not particularly limited. The degreasing step of this Step S180 may be omitted depending on the type of the three-dimensional shaped article to be produced such as when a three-dimensional shaped article made of a resin is produced.

Then, in a sintering step of Step S190, the shaping material is sintered by heating the structure body S after being degreased in the degreasing step of Step S180 using an external device or the like. Even if the resin component such as the binder of the structure body S remains even after executing the degreasing step of Step S180, the resin component is removed as the sintering step of this Step S190 is executed. Then, as the sintering step of this Step S190 is completed, the three-dimensional shaped article production method of this embodiment is completed. The sintering step of this Step S190 may be omitted depending on the type of the three-dimensional shaped article to be produced in the same manner as the degreasing step of Step S180.

Subsequently, a detailed configuration of the head 3 will be described with reference to FIGS. 5 to 7. Here, the head 3A and the head 3B have the same structure. Therefore, the following description corresponds to both the head 3A and the head 3B. Note that the solid line arrows in FIG. 7 indicate directions at which the liquid flows inside the head 3.

Figure 5:
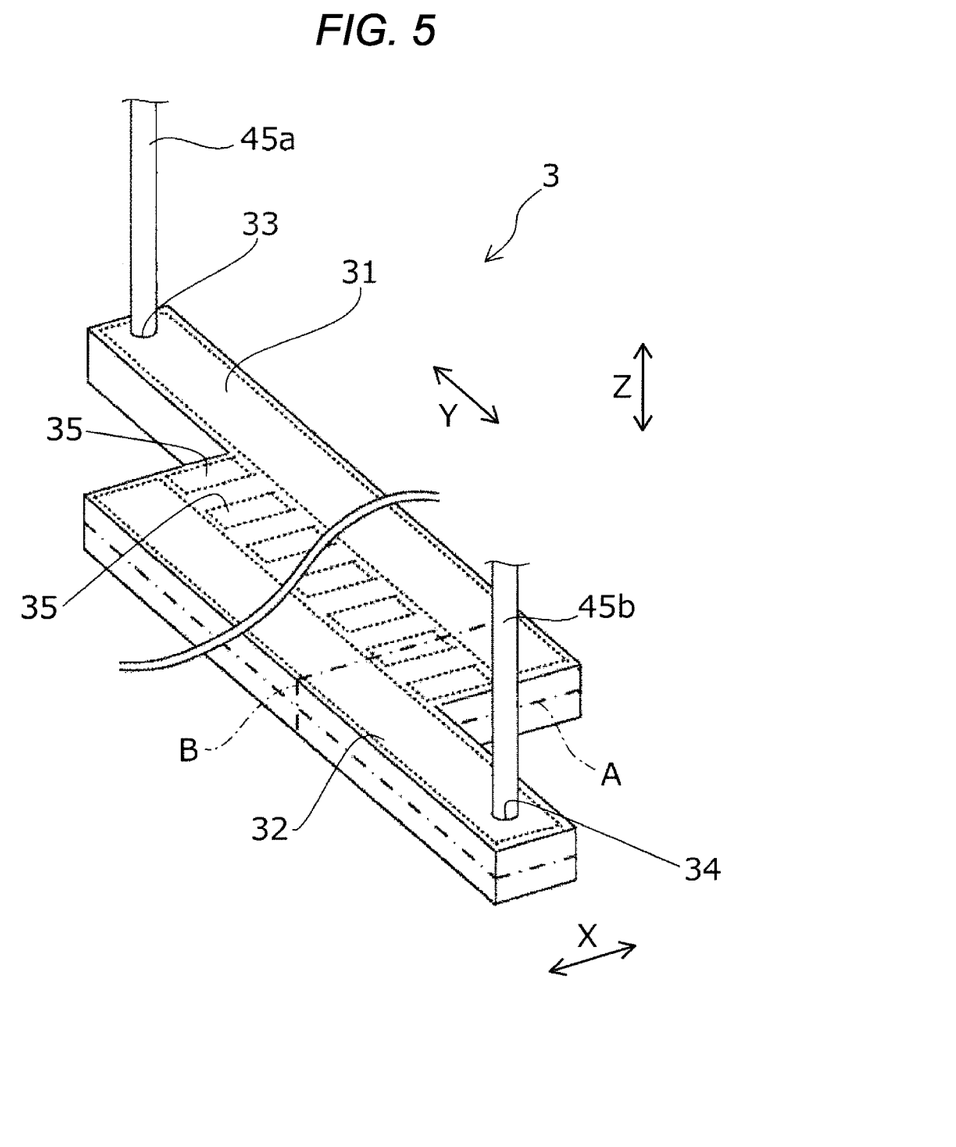
FIG. 5 is a perspective view showing a head of the three-dimensional shaped article production apparatus in FIG. 1.

As shown in FIG. 5, the head 3 is coupled to the supply flow channel 45*a* and the first circulation flow channel 45*b*. The supply flow channel 45*a* as the supply flow channel for supplying the liquid to the inside of the head 3, and the first circulation flow channel 45*b* as the circulation flow channel for circulating the liquid inside the head 3 by once discharging the liquid outside can be regarded as constituting a part of the head 3. Expressed in another way, the head 3 includes the supply flow channel 45*a* and the first circulation flow channel 45*b*. The supply flow channel 45*a* is coupled to the supply port 33, and the first circulation flow channel 45*b* is coupled to the discharge port 34.

Figure 7:
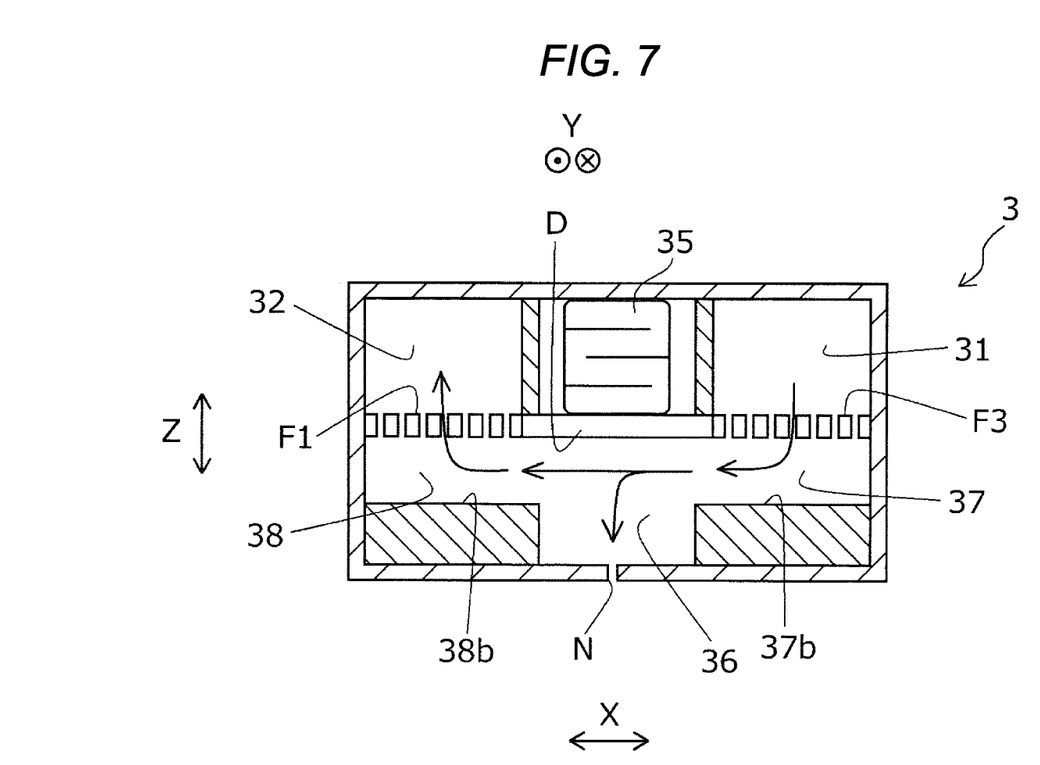
FIG. 7 is a cross-sectional side view taken along the alternate long and short dash line B in FIG. 5 showing the head of the three-dimensional shaped article production apparatus in FIG. 1.

As shown in FIGS. 5 to 7, the head 3 includes a supply liquid chamber 31 having the supply port 33, and the liquid is sent to the supply liquid chamber 31 from the supply flow channel 45*a* through the supply port 33. Further, as shown in FIGS. 6 and 7, the head 3 includes an individual supply flow channel 37 that communicates with the supply liquid chamber 31 through a filter F3, and the liquid supplied to the supply liquid chamber 31 is sent to the individual supply flow channel 37.

As shown in FIGS. 5 and 7, the head 3 includes a piezoelectric element 35 to be deformed along the Z direction by applying a voltage, and the piezoelectric element 35 is disposed in a space at an opposite side to a pressure chamber 36 across a vibration plate D in the Z direction. As shown in FIGS. 6 and 7, the pressure chamber 36 communicates with the individual supply flow channel 37, and the liquid is sent to the pressure chamber 36 from the individual supply flow channel 37. Further, the nozzle N communicates with the pressure chamber 36, and the volume of the pressure chamber 36 is shrunk by deforming the piezoelectric element 35 so as to pressurize the liquid in the pressure chamber 36, whereby the liquid is ejected from the nozzle N. Note that the lower side in FIG. 7 is a vertically downward direction, and the ejection direction of the liquid from the nozzle N is the vertically downward direction corresponding to the gravity direction.

As described above, the three-dimensional shaped article production apparatus 1 of this embodiment includes the liquid supply system 40 shown in FIG. 2, and circulates the liquid to be supplied to the head 3 and supplies the liquid. Therefore, in order to circulate the liquid once sent to the pressure chamber 36, the pressure chamber 36 also communicates with an individual circulation flow channel 38 in addition to the individual supply flow channel 37. The individual circulation flow channel 38 communicates with a circulation liquid chamber 32 having the discharge port 34 through a filter F1. The three-dimensional shaped article production apparatus 1 of this embodiment circulates the liquid by allowing the liquid to flow in the supply flow channel 45*a*, the supply liquid chamber 31, the individual supply flow channel 37, the pressure chamber 36, the individual circulation flow channel 38, the circulation liquid chamber 32, and the first circulation flow channel 45*b* inside the head 3.

In this manner, the head 3 includes the nozzle N that ejects the liquid, the pressure chamber 36 that communicates with the nozzle N, the supply flow channel 45*a* as the supply flow channel that communicates with the pressure chamber 36 upstream in the supply direction of the liquid, the supply liquid chamber 31, the individual supply flow channel 37, the individual circulation flow channel 38 as the circulation flow channel that communicates with the pressure chamber 36 downstream in the supply direction of the liquid, the circulation liquid chamber 32, and the first circulation flow channel 45*b*. Further, the filter F1 as the first filter is provided in the circulation flow channel, and as the filter F1, a filter having a pore diameter larger than the particle diameter of the powder for forming the powder layer is used. Note that the "supply direction of the liquid" is meant to include not only a direction at which the liquid flows to the pressure chamber 36 side from the supply flow channel 45a side, but also a direction at which the liquid flows to the first circulation flow channel 45b side from the pressure chamber side. That is, the supply direction of the liquid corresponds to the circulation direction of the liquid in the circulation section 41. Further, as the "pore diameter", for example, the maximum diameter of the pore can be adopted, and also the catalogue value or the like of the filter can be adopted. Further, as the "particle diameter", for example, the maximum particle diameter of the powder or the like can be adopted, and also a value or the like measured by a laser diffraction or scattering method, or the like can be adopted. In addition thereto, a value or the like measured by observing the powder with an electron microscope can also be adopted.

A foreign substance generated with the production of the head 3 during the production of the head 3 or the like sometimes flows backward from the circulation flow channel to the pressure chamber 36 to deteriorate the performance of the head 3, however, by providing the filter F1 in the circulation flow channel as in the three-dimensional shaped article production apparatus 1 of this embodiment, the foreign substance generated with the production of the head 3 can be prevented from flowing backward from the circulation flow channel to the pressure chamber 36. Further, as in the three-dimensional shaped article production apparatus 1 of this embodiment, in the configuration in which the powder layer is formed and the liquid is ejected from the nozzle N of the head 3 to the powder layer, the powder for forming the powder layer sometimes enters the inside of the head 3 from the nozzle N. When the powder enters the inside of the head 3, the liquid sometimes thickens and the ejection failure of the liquid may occur. However, in the three-dimensional shaped article production apparatus 1 of this embodiment, the filter F1 is provided in the circulation flow channel, and the pore diameter of the filter F1 is larger than the particle diameter of the powder for forming the powder layer. Therefore, in the three-dimensional shaped article production apparatus 1 of this embodiment, the liquid can be prevented from continuously thickening between the nozzle N and the filter F1 due to successive accumulation in the head 3 because the powder that enters the inside of the head 3 from the nozzle N cannot pass through the filter F1. Accordingly, in the three-dimensional shaped article production apparatus 1 of this embodiment, the liquid in the head 3 can be prevented from thickening, so that the ejection failure of the liquid can be suppressed.

Here, the inner diameter of the nozzle N is larger than the pore diameter of the filter F1. Therefore, in the three-dimensional shaped article production apparatus 1 of this embodiment, even if the powder enters the inside of the head 3 from the nozzle N, in the preshaping flushing step, the liquid ejection step, the flushing step, or the like, the powder can be discharged again through the nozzle N.

Further, as shown in FIG. 2, in the three-dimensional shaped article production apparatus 1 of this embodiment, a filter F2 is provided in the first circulation flow channel 45b. Expressed in another way, in the three-dimensional shaped article production apparatus 1 of this embodiment, the filter F2 as the second filter is provided at a position downstream in the supply direction of the liquid of the filter F1. Therefore, the capture performance of a foreign substance contained in the liquid returning to the supply flow channel from the circulation flow channel is enhanced. As described above, in the three-dimensional shaped article production apparatus 1 of this embodiment, the filter F2 is provided in the first circulation flow channel 45b as the position downstream in the supply direction of the liquid of the filter F1 in the circulation flow channel. However, it is not limited to such a configuration, and the filter F2 may be provided, for example, in the second circulation flow channel 45c, the pressurization controlling liquid tank 43a, or the depressurization controlling liquid tank 43b.

Here, the pore diameter of the filter F2 is smaller than the particle diameter of the powder for forming the powder layer. Therefore, the three-dimensional shaped article production apparatus 1 of this embodiment is configured to be able to capture the powder that enters the inside of the head 3 from the nozzle N and passes through the filter F1 by the filter F2.

The filter F2 can be detached from the first circulation flow channel 45b, and a user can easily replace it with a new filter F2. Therefore, when clogging or the like of the filter F2 has occurred to deteriorate the performance as the filter, or the like, a user can easily return the filter F2 to the original state.

Here, as shown in FIG. 2, in the three-dimensional shaped article production apparatus 1 of this embodiment, the flow rate sensor 46 is provided in the first circulation flow channel 45b. More specifically, the flow rate sensor 46 is provided at a position downstream in the supply direction of the liquid of the filter F2 in the first circulation flow channel 45b. Then, the control unit 12 outputs information for replacing the filter F2 to a PC or the like as the external device 20 when it is detected that the flow rate of the liquid is equal to or less than a preset threshold value by the flow rate sensor 46. Therefore, a user who uses the three-dimensional shaped article production apparatus 1 of this embodiment can easily recognize an appropriate time to replace the filter F2.

Further, as shown in FIG. 7, in the three-dimensional shaped article production apparatus 1 of this embodiment, the filter F3 as the third filter is provided at a position between the supply liquid chamber 31 and the individual supply flow channel 37 constituting the supply flow channel together. Here, the pore diameter of the filter F3 is smaller than the particle diameter of the powder for forming the powder layer. In this manner, in the three-dimensional shaped article production apparatus 1 of this embodiment, the filter F3 having a pore diameter smaller than the particle diameter of the powder for forming the powder layer is provided in the supply flow channel, and therefore, the powder that enters the inside of the head 3 from the nozzle N can be prevented from flowing backward in the supply flow channel.

Second Embodiment

Figure 8:
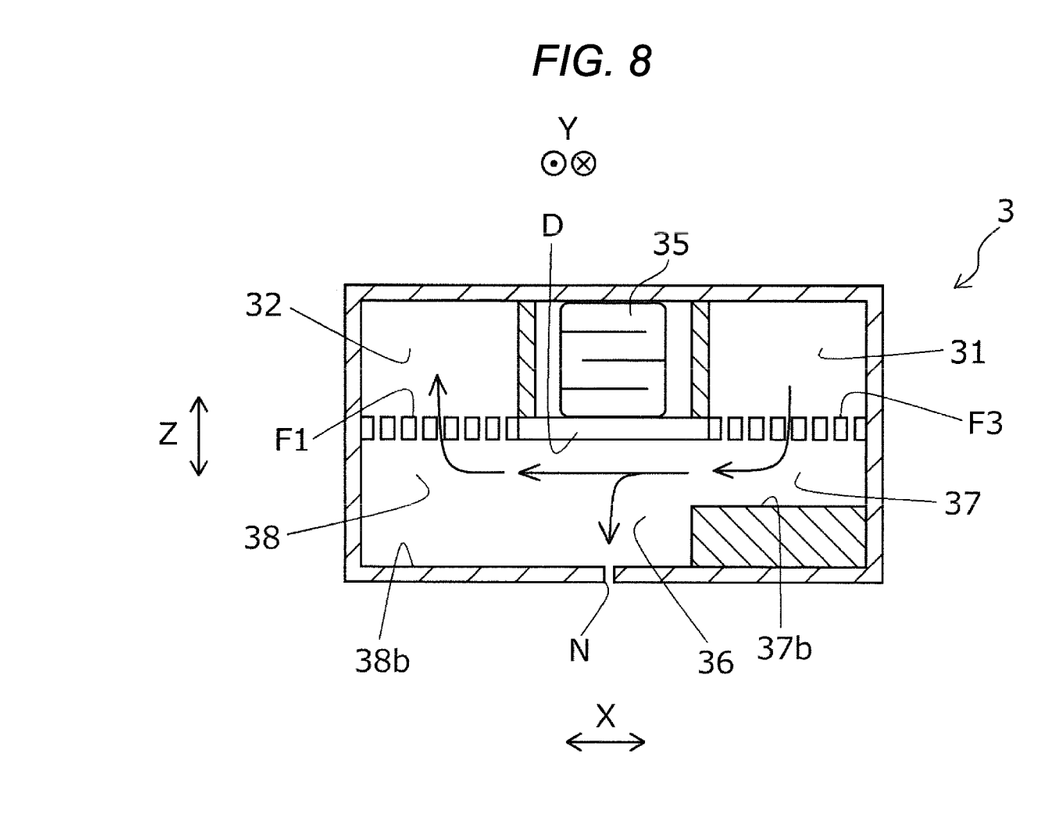
FIG. 8 is a cross-sectional side view showing a head of a three-dimensional shaped article production apparatus according to the present disclosure according to a second embodiment.

Hereinafter, a three-dimensional shaped article production apparatus 1 of a second embodiment will be described with reference to FIG. 8. FIG. 8 is a view corresponding to FIG. 7 in the three-dimensional shaped article production apparatus 1 of the first embodiment, and the solid line arrows in FIG. 8 indicate directions at which the liquid flows inside the head 3. In FIG. 8, the constituent members common to those of the first embodiment are denoted by the same reference numerals, and a detailed description thereof will be omitted.

Here, in the three-dimensional shaped article production apparatus 1 of this embodiment, the configuration other than the head 3 is the same as the configuration of the three-dimensional shaped article production apparatus 1 of the first embodiment. Further, the head 3 of this embodiment includes the supply liquid chamber 31 having the supply port 33, and the liquid is sent to the supply liquid chamber 31 from the supply flow channel 45a through the supply port 33 in the same manner as the head 3 of the first embodiment. Then, the head 3 of this embodiment includes the individual supply flow channel 37 that communicates with the supply liquid chamber 31 through the filter F3, and the liquid supplied to the supply liquid chamber 31 is sent to the individual supply flow channel 37 in the same manner as the head 3 of the first embodiment.

As shown in FIG. 8, the head 3 of this embodiment includes the piezoelectric element 35 to be deformed along the Z direction by applying a voltage, and the pressure chamber 36 is formed at a position opposed to the piezoelectric element 35 in the Z direction through the vibration plate D in the same manner as the head 3 of the first embodiment. As shown in FIG. 8, the pressure chamber 36 communicates with the individual supply flow channel 37, and the liquid is sent to the pressure chamber 36 from the individual supply flow channel 37. Further, the nozzle N communicates with the pressure chamber 36, and by deforming the piezoelectric element 35, the pressure chamber 36 is pushed by the vibration plate D and the liquid in the pressure chamber 36 is pressurized, so that the liquid is ejected from the nozzle N. Note that the lower side in FIG. 8 is a vertically downward direction, and the ejection direction of the liquid from the nozzle N is the vertically downward direction corresponding to the gravity direction.

The three-dimensional shaped article production apparatus 1 of this embodiment includes the liquid supply system 40 shown in FIG. 2, and circulates the liquid to be supplied to the head 3 and supplies the liquid in the same manner as the three-dimensional shaped article production apparatus 1 of the first embodiment. Therefore, in order to circulate the liquid once sent to the pressure chamber 36, the pressure chamber 36 also communicates with the individual circulation flow channel 38 in addition to the individual supply flow channel 37. The individual circulation flow channel 38 communicates with the circulation liquid chamber 32 having the discharge port 34 through a filter F1. That is, the three-dimensional shaped article production apparatus 1 of this embodiment circulates the liquid by allowing the liquid to flow in the supply flow channel 45a, the supply liquid chamber 31, the individual supply flow channel 37, the pressure chamber 36, the individual circulation flow channel 38, the circulation liquid chamber 32, and the first circulation flow channel 45b inside the head 3 in the same manner as the three-dimensional shaped article production apparatus 1 of the first embodiment.

As shown in FIG. 7, in the head 3 of the first embodiment, the position of a bottom face 37b of the individual supply flow channel 37 in the Z direction is substantially the same position as the position of a bottom face 38b of the individual circulation flow channel 38. On the other hand, as shown in FIG. 8, in the head 3 of this embodiment, the position of the bottom face 38b of the individual circulation flow channel 38 in the Z direction is located at a lower position than the position of the bottom face 37b of the individual supply flow channel 37 in the Z direction.

Expressed in another way, in the three-dimensional shaped article production apparatus 1 of this embodiment, the bottom face 38b of the individual circulation flow channel 38 that is a region adjacent to the pressure chamber 36 in the circulation flow channel is disposed at a lower position in the gravity direction than the bottom face 37b of the individual supply flow channel 37 that is a region adjacent to the pressure chamber 36 in the supply flow channel. Here, the powder that enters the inside of the head 3 from the nozzle N is likely to flow to a lower side due to the effect of gravity. Therefore, according to such a configuration, the powder that enters the inside of the head 3 from the nozzle N is more likely to flow to the circulation flow channel side than to flow backward to the supply flow channel side. Accordingly, in the three-dimensional shaped article production apparatus 1 of this embodiment, it is possible to prevent the powder that enters the inside of the head 3 from the nozzle N from flowing backward in the supply flow channel.

The present disclosure is not limited to the above-mentioned embodiments, but can be realized in various configurations without departing from the gist of the present disclosure. For example, the technical features in the embodiments corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaped article production apparatus, comprising:
   a shaping table;
   a layer forming section that forms a powder layer at the shaping table;
   a head that ejects a liquid containing a binder to a shaping region of a three-dimensional shaped article in the powder layer;
   a liquid supply system that supplies the liquid to the head; and
   a moving system that relatively moves the head with respect to the shaping table, wherein
   the head includes a nozzle that ejects the liquid, a pressure chamber that communicates with the nozzle, a supply flow channel that communicates with the pressure chamber upstream in a supply direction of the liquid, and a circulation flow channel that communicates with the pressure chamber downstream in the supply direction,
   the supply flow channel includes a first filter, and
   a pore diameter of the first filter is smaller than a particle diameter of a powder for forming the powder layer.

2. The three-dimensional shaped article production apparatus according to claim 1,
   wherein the head includes a temperature sensor.

3. The three-dimensional shaped article production apparatus according to claim 1,
   wherein the liquid supply system includes a pressurization controlling liquid tank, a depressurization controlling liquid tank, and a second filter, and
   a pore diameter of the second filter is smaller than the particle diameter of the powder for forming the powder layer.

4. The three-dimensional shaped article production apparatus according to claim 3,
   wherein the second filter is provided in the second circulation flow channel, the pressurization controlling liquid tank, or the depressurization controlling liquid tank.

5. The three-dimensional shaped article production apparatus according to claim 3, wherein the second filter is replaceable.

6. The three-dimensional shaped article production apparatus according to claim 3, wherein the liquid supply system includes a flow rate sensor of the liquid, information for replacing the second filter is output when it is detected that the flow rate of the liquid is equal to or less than a threshold value by the flow rate sensor.

* * * * *